United States Patent [19]

Vereschagin et al.

[11] 3,912,500

[45] Oct. 14, 1975

[54] PROCESS FOR PRODUCING DIAMOND-METALLIC MATERIALS

[76] Inventors: Leonid Fedorovich Vereschagin, Kutuzovsky prospekt 2/1, kv.231; Aik Akopovich Semerchian, Kutuzovsky prospekt, 2/1, kv. 205, both of Moscow; Vitaly Pavlovich Modenov, ulitsa Tsentralnaya 10, kv. 47, Moskovskaya oblast; Tamara Timofeevna Bocharova, Shkolnaya ulitsa 6, kv. 16, Moskovskaya oblast; Mikhail Eremeevich Dmitriev, ulitsa Shkolnaya, 4, kv. 64, Moskovskaya oblast, all of U.S.S.R.

[22] Filed: Oct. 26, 1973

[21] Appl. No.: 409,944

Related U.S. Application Data

[63] Continuation of Ser. No. 319,048, Dec. 27, 1972, abandoned.

[52] U.S. Cl. ............... 75/201; 29/182.1; 29/182.5; 51/309; 75/200; 75/214; 75/226; 125/39
[51] Int. Cl. ............................................ B22f 3/16
[58] Field of Search ............ 75/201, 226, 214, 200; 29/182.1, 182.5; 51/309; 125/39

[56] References Cited
UNITED STATES PATENTS

| | | | |
|---|---|---|---|
| 2,068,848 | 1/1937 | De Bats | 75/200 |
| 2,228,871 | 1/1941 | De Bats | 29/182.8 |
| 2,367,404 | 1/1945 | Kott | 75/200 |
| 2,582,231 | 1/1952 | Catallo | 29/182.8 |
| 2,703,750 | 3/1955 | Cotter | 75/201 |
| 3,396,054 | 8/1968 | Gremion | 75/201 X |
| 3,719,479 | 3/1973 | Flanagan | 29/182.1 X |

OTHER PUBLICATIONS

Jones, W. D. Fund. Prin. of Powder Met., Arnold, Ltd., London, 1960. pp. 806–807. TN 695 S6.

*Primary Examiner*—Benjamin R. Padgett
*Assistant Examiner*—R. E. Schafer
*Attorney, Agent, or Firm*—Holman & Stern

[57] ABSTRACT

A process for producing diamond-metallic materials comprising subjecting a system consisting of diamond powder and a metallic binder, to a pressure of 10 to 50 kbar. The metallic binder is not mixed with the diamond powder initially, but rather is contained as a separate entity in any portion of the diamond powder. After packing, the diamond powder and metallic binder are heated, still under pressure, to a temperature sufficient to melt the metallic binder. The molten metallic binder is caused by the pressure to fill the inter-grain pores of the packed diamond powder.

10 Claims, 1 Drawing Figure

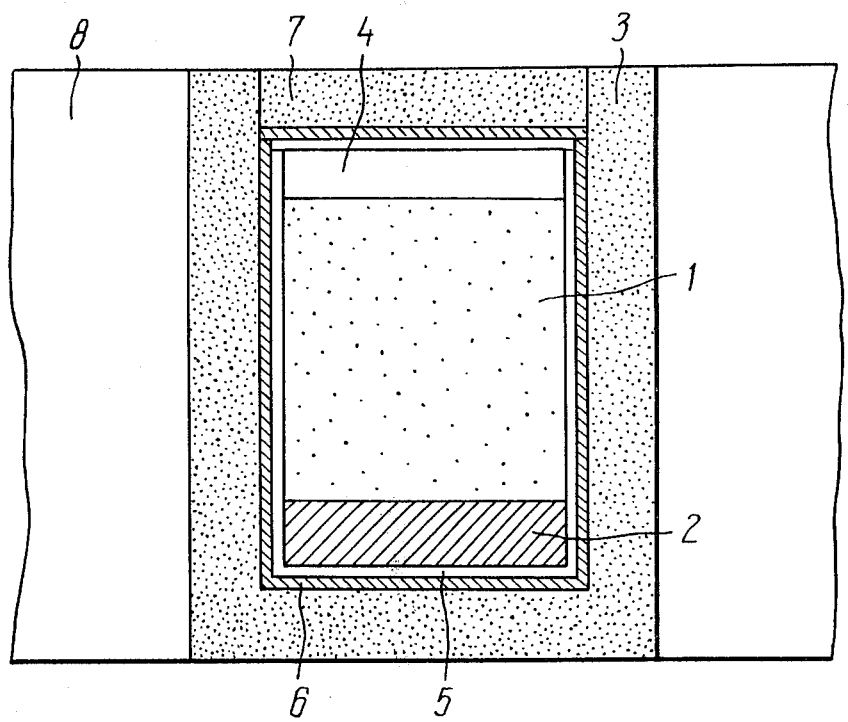

PROCESS FOR PRODUCING DIAMOND-METALLIC MATERIALS

This is a continuation of application Ser. No. 319,048, filed Dec. 27, 1972, now abandoned.

BACKGROUND AND SUMMARY OF THE INVENTION

The present invention relates to diamond materials and, more specifically, to a process for producing diamond-metallic materials referred to in the patent literature as diamond compacts. They are known to comprise a composition of diamond crystals and a metallic binder which is dispersed mainly inside the interstices between individual diamond crystals and tightly bonds the latter to one another.

Due to a high concentration of diamonds, said compacts approach, to some extent, single-crystalline diamonds in such properties thereof as abrasion resistance, hardness, and elastic modulus. The extent of such approach depends substantially on the process technology of the compacts produced.

Applications of compacts are similar to those of large single crystals of diamond, they are useful for processing hard and brittle materials such as glass, ceramics and, for processing or drilling rocks, as well as for manufacturing various articles which should possess elevated hardness, high abrasion resistance and compression strength, for instance, movable parts of precision instruments, most critical parts of high-pressure vessels, and the like. These compacts are much more easily available and less expensive as compared to large single-crystalline diamonds, since diamond powder necessary for their production is now produced in large quantities.

Known in the art are various processes for producing diamond-metal compacts by impregnating diamond powder with a metallic binder; these processes provide for simultaneous application of high pressure and temperature to a system comprising diamond powder and a metallic binder. Said system is a mechanical mixture of diamond power and metal powder, a metallic binder, which in this case, is incorporated into diamond powder in advance and directly dispersed among its grains. The content of a metal powder is less than or equal to 50% by volume or 20 to 30% by volume. Such a mixture is first subjected to a high pressure ranging from 70 to 85 kbar or from 20 to 76 kbar. The mixture is then heated, still under said pressure, to a temperature ensuring melting of said binder and filling of the intergrain diamond pores therewith.

These prior-art processes have a disadvantage residing in an insufficient packing density of diamond grains in the final compact and the occurrence of metallic interlayers in the regions of diamond-to-diamond contact, whereby hardness and other mechanical characteristics of the entire article are impaired. In fact, under the action of high pressure on the starting diamond-metal mixture, it is not possible to attain maximally dense packing of diamond grains, since such packing is hindered by the metallic powder present in a considerable amount in the starting mixture. Upon the subsequent application of heat simultaneously with pressure, the metal powder melts and fills the integrain diamond pores, but part of the metal still remains in the form of a film in the regions where diamond grains contact one another. As a consequence, diamond grains become separated from one another by a metal film, whereby the material hardness is lowered, as well as its compression strength and elastic modulus, since the respective properties of the metal are substantially less pronounced than those of diamond crystals.

Another disadvantage of the prior art processes for the production of compacts from a diamond-metal powder-like mixture resides in the fact that during melting of a metal powder within the entire bulk of the diamond-metal mixture at the same time, adsorbed gases, foreign atoms, and other contaminants constantly present on the surface of diamond crystals cannot find their way out and thus remain within the compact volume. This condition results in microporosity and, hence, reduction in hardness, compression strength, and elastic modulus.

It is an object of the present invention to provide a process for producing diamond-metallic materials free from the above disadvantages and possessing, in addition to their high abrasion resistance, improved hardness, compression strength, and elastic modulus as well.

This object is accomplished by providing a process for producing diamond-metallic materials by impregnating diamond power with a metallic binder under the action of pressure and heat, wherein use is made, according to the present invention, of a system composed of diamond powder-metallic binder and the latter being disposed as a seperate entity in any portion of the diamond powder but in contact therewith. This is subjected to a pressure of at least 10 kbar for closely packing the diamond powder, whereafter said system with the packed diamond powder is subjected to the simultaneous action of a pressure of at least 10 kbar and heating at a temperature sufficient for melting the metallic binder. The metallic binder melts and fills, under pressure, the diamond powder.

The metallic binder may be disposed in the system by various methods, e.g. under a layer of diamond powder, above a layer of diamond power, or along the side face of a diamond briquette, but by all means contacting said binder by any portion of said diamond briquette.

Under the term "metallic binder" as used therein, is intended any metal or alloy having a boundary angle of wetting of less than 90° in respect of diamond. Such metals may be nickel, cobalt, iron, manganeses, chromium, and the like. As the metallic binder use may be made of alloys of metals wetting diamond, as well as alloys of metals wetting diamond with metals non-wetting diamond or with non-metals. Such alloys may be nickel-chromium, nickel-magnaense, nickel-copper, cobalt-copper, titanium-copper, zirconium-copper, nickel-copper-aluminum, nickel-copper-silicon, and the like. The wetting metal content in said alloys may be different, but it is desirable that it be of at least 15 to 30% by volume. It is possible to employ alloys with a wetting metal content even less than that mentioned above, but in this case, the resulting properties will be less pronounced.

The amount of metallic binder is elected so that it is sufficient to fill voids between the diamond particles. It is known that voids in diamond powder compressed under a pressure of at least 10 kbar may amount to 10 to 30% by volume depending on the proportions of the employed diamond powders of various grain size. Therefore, the binder volume should constitute 10 to 30% of the volume occupied by compressed diamond powder. If a binder is employed in an amount exceeding these limits, it is permitted that a layer of another powder with solid particles be disposed on the opposite side of a diamond-powder briquette, such as boron carbide $B_4C$. This layer will take up excess binder after the melting thereof thus impregnating the diamond-power briquette.

The starting diamond powder grain size is selected depending on the final application of the diamond-metallic material to be produced. If it is intended for abrasion processing, a large size of the starting powder grains is preferred, e.g. 15 to 250 $\mu$. If the material should possess a high compression strength and hardness, it is advisable to select finely grained diamond powders with a particle size of 15 $\mu$ and less. In many applications, it is advantageous to employ mixtures of diamond powders of various grain size which makes it possible to increase the amount of the diamond component of the material to the maximum possible extent, since, in doing so, voids between coarse diamond grains become filled with fine diamond grains. A preferential ratio of large and fine powder grains ranges from 3:1 to 10:1. The volumetric proportion of large and fine grains is 70–80 and 30–20%, respectively.

The pressure acting upon the system, diamond powder — metallic binder, should be of at least 10 kbar and usually selected within the range of from 10 to 50 kbar. Pressures above 50 kbar facilitate packing of diamond powder, especially finely-grained powder, and its impregnation with a metallic binder. However, it should be understood that though pressures of the order of 50–100 kbar and over produce better packing of the diamond powder and the final product is of higher quality, the service life of the chamber wherein the process is performed is substantially reduced.

Pressure selection is also influenced by the starting diamond grain size. The smaller the starting grains, the higher the pressure applied and, vice versa, the larger the starting grains, the lower the pressure, since large grains are more susceptible to mechanical damage and cracking when compressed in a pressure chamber than smaller ones. in practice, when diamond powder is used having a grain size of from 0.5 to 15 $\mu$, the pressure employed is 30 to 50 kbar, whereas for diamond powder having a grain size of 15 to 250 $\mu$ the pressure employed is 10 to 20 kbar. When a mixture of diamond powders is used, the recommended pressure range may be substantially exceeded. Properly selected pressures ensure the production of high quality articles and enable, at the same time, an extension the service life of a pressure chamber without the replacement thereof.

The present invention makes it possible, depending on the grain size of the diamond powder and binder employed, to produce diamond metallic materials possessing extremely high mechanical properties: hardness of 95–96 units HRA (for diamond grains of 3 to 5 $\mu$ size; HRA-Rockwell hardness, scale A), compression strength of 450 to 550 kg/mm$^2$, and elastic modulus of 55,000 kg/mm$^2$ (for diamond grains of 10 to 15 $\mu$ size). When a cone made of a diamond-metallic material (with diamond grain size 3 to 5 $\mu$) is pressed in a tungsten-carbide alloy of the composition 94% WC and 6% Co, said diamond-metallic material withstands contact pressure of up to 10,000 kg/mm$^2$.

In addition to high mechanical characteristics, the diamond-metallic materials produced in accordance with the present invention possess satisfactory viscosity.

An important feature of the present process for producing diamond-metallic materials according to the invention resides in a possibility of manufacturing big articles up to 10 ccm in volume or even more. An article volume is defined by the dimensions of a reaction volume of a pressure chamber and, since pressures required for performing the present process are relatively small, the dimensions of a reaction volume may be easily increased over 10 ccm.

The high level of mechanical properites of the diamond-metallic materials produced in accordance with present invention results from the fact that, in accordance with the invention, in the starting system, diamond power—metallic binder, the latter is not mixed with the diamond powder, as in the prior-art processes, but is outside the diamond powder and in contact therewith, while the penetration into of the binder, the already packed diamond powder is effected under a pressure at least 10 kbar and at a temperature sufficient for melting the metallic binder.

Therefore, the diamond powder is closely packed by applying pressure thereto in the absence of a metallic binder therein. This embodiment makes it possible to obtain the densest packing of diamond grains and to form a solid diamond carcass with a plurality of diamond-to-diamond contact sites. The binder is incorporated into the already packed diamond powder still under pressure, with the result that the binder fills the inter-grain pores in the diamond matrix. The diamond carcass formed under pressure is thus bonded with the solidified metallic binder. Diamond-metallic materials of this type function rather well under conditions of compressing loads, since such loads are taken up mainly by the diamond carcass, the diamond-to-diamond contact regions of the latter being not weakened by metallic interlayers. The metallic binder only secures individual grains of the diamond matrix, preventing them from mutual displacement.

Furthermore, during said impregnation of diamond powder with the metallic binder, superficial contaminations of diamond grains and foreign atoms pass into the metal melt, while being concentrated at the melt front which impregnates the diamond matrix and brings said contaminations outside its borders.

Due to this phenomenon, the major part of the diamond-metallic material now contains as few impurities as possible. The superficial layer of the diamond-metallic material where the melt front is stopped and where contaminations and defects are concentrated, may be relatively easily removed by subsequent mechanical processing of the article.

In order to reduce the consumption of diamond powder, at a purported site of the melt stoppage, it can be replaced by boron carbide $B_4C$ powder. Therefore, the defective layer to be removed containing a considerable amount of contaminations will be constituted by boron carbide, not diamond, which is much less expensive.

Therefore, the process according to the present invention enables the production of a diamond-metallic material with a predetermined structure: solid diamond carcass with a plurality of direct diamond-to-diamond contacts, and a metallic binder distributed within inter-grain pores of the diamond matrix.

DESCRIPTION OF THE PREFERRED EMBODIMENTS

The following is the description of an embodimentt of the process according to the present invention with reference to the drawing, wherein a pressure chamber is shown.

The starting components of a diamond-metallic material, viz. diamond powder 1 of a selected grain size or a mixture of diamond powders of various grain size and a compact metallic binder 2 are placed in a graphite container-heater 3. The metallic binder has the form of pre-pressed powder or chips molded to a predetermined shape and dimensions during the pressing, or in the form of a monolithic piece of metal shaped to the predetermined configuration and dimensions by turning. The metallic binder is placed within the graphite heater so as to contact the diamond powder. From the opposite side, with respect to the binder, a layer 4 of boron carbide $B_4C$ may be placed onto the diamond powder. The graphite heater walls may be electrically insulated from the heater contents by means of gaskets 5 made of mica or hexagonal boron nitride. To prevent the diamond-metallic material from the penetration of gases evolved during heating from said graphite heater 3, the latter may be isolated mechanically for the purpose of its separation from the heater contents by means of, for example, a foil 6 made of a refractory metal such as tantalum or tungsten. The filled container-heater 3 is then covered with a graphite lid 7.

The heater 3 with its contents is then placed in a container 8 made of katlinite or pyrofillite. Katlinite or pyrofillite are employed for transmitting and equalizing pressure applied to the reaction volume. The heating is effected by passing electric current through the graphite heater along its longitudinal axis (not shown).

The process for producing a diamond-metallic material according to the present invention includes the following technological steps performed in this order: the container 8 is first subjected to a pressure of at least 10 kbar and over. In doing so, the diamond powder is closely packed. Then heating is conducted to a temperature ensuring melting of the metallic binder 2. The molten binder 2 impregnates under pressure the packed diamond powder. The system is maintained at the impregnation temperature usually for a period of from 30 sec. to 3 min. Then the heating is discontinued and after solidifying the metallic binder for an additional period of 0.5–2 min the pressure is brought to zero.

It should be noted that the present process also makes it possible to produce diamond-metallic articles of a predtermined shape. A required shape of a diamond-metallic article may be obtained by means of ceramic inserts placed into the graphite heater prior to the diamond charging. Another approach contemplates respective shaping of the inner cavity of the graphite heater which may be made spherical, octahedral, etc., depending on the required shape of a diamond-metallic article.

If it is necessary to produce shaped diamond-metallic parts with internal holes or depressions, the metallic binder is molded according to the shape of such hole or depression and placed within the diamond powder. To produce diamond-metallic parts having a relief surface, a corresponding relief is made on the binder surface contacting the diamond powder. Such relief is reproduced on the surface of a diamond-metallic part manufactured in accordance with the process of the present invention.

The following are examples illustrating the process according to the present invention.

EXAMPLE 1

A diamond-metallic material is produced in an apparatus shown in the drawing.

The internal cavity of the graphite heater 3 has a diameter rof 30 mm and a height of 30 mm. As the starting materials use is made of diamond powder with a grain size of $150\mu$ and metallic binder 2, which is an alloy containing zirconium and 50% by weight of copper. The filled container-heater 3 is subjected to 10 kbar pressure at a temperature of 1,250°C. The system is maintained at this temperature for 1.5 min. The resulting material is employed for making tools adapted for stone processing.

EXAMPLE 2

The process is performed according to the procedure disclosed in Example 1. The starting materials are: diamond powder with a grain size of 150 $\mu$; as the metallic binder use is made of metallic nickel. Process conditions: pressure — 20 kbar; temperature — 1.500°C; treatement time — 1.5 min. The resulting material has high abrasion properties and a high viscosity as well.

EXAMPLE 3

The internal cavity of the graphite heater 3 has a diameter of 15 mm and a height of 15 mm. Diamond powder with a grain size of 10 to 15 $\mu$ and a metallic binder, which is titanium alloy with 40% by weight of copper are subjected to 30 kbar pressure and 1,200°C temperature. Treatment at this temperature takes 1 min. The material thus obtained has a compression strength of 500 $kg/mm^2$ and an elastic modulus of 55,000 $kg/mm^2$.

EXAMPLE 4

The reaction cavity has the same dimensions as in Example 3. Diamond powder with a grain size of 3 to 5 $\mu$ and a binder, which is titanium alloy with 45% by weight of copper are subjected to 50 kbar pressure and 1,150°C temperature for 1 min. The resulting material has an HRA hardness of 96.

What is claimed is:

1. A process for producing diamond-metallic materials which comprises: subjecting a system composed of diamond powder and metallic binder to a pressure of at least 10 kbar to thereby closely pack said diamond powder, the metallic binder being disposed as a separate entity in any portion of the diamond powder but in contact therewith while said diamond powder is being packed; and therafter, while maintaining the system with the packed diamond powder under said pressure of at least 10 kbar, simultaneously heating the system to a temperature sufficient for melting said metallic binder, whereby the metallic binder melts and impregnates said diamond powder under said pressure.

2. A process as claimed in claim 1, wherein the packing of the diamond powder and impregnation thereof with the metallic binder are performed under a pressure within the range of from 10 to 50 kbar.

3. A process as claimed in claim 1, wherein the packing of the diamond powder and impregnation thereof with the metallic binder are performed under a pressure of 30 kbar.

4. A process as claimed in claim 1, wherein as the metallic binder use is made of a metal having a boundary angle of wetting diamond than or equal to 90°l.

5. A process as claimed in claim 1, wherein as the metallic binder use is made of an alloy having a boundary angle of wetting diamond than or equal to 90°.

6. A process as claimed in claim 1, wherein the diamond powder has a grain size of from 0.5 to 250 $\mu$.

7. A process as claimed in claim 1, wherein the metallic binder is metallic nickel, cobalt, or chromium manganese or chromium.

8. A process as claimed in claim 1, wherein the metallic binder is zirconium alloy with 50% by weight of copper.

9. A process as claimed in claim 1, wherein the metallic binder is titanium alloy with 40 to 45% by weight of copper.

10. A process as claimed in claim 1, wherein the metallic binder is present in the amount of 10 to 30% by volume of the diamond powder.

* * * * *